United States Patent
Blake et al.

(10) Patent No.: US 7,832,641 B2
(45) Date of Patent: *Nov. 16, 2010

(54) SCANNER SWITCHED TO ACTIVE STATE BY SENSED MOVEMENT IN QUIESCENT SCANNING MECHANISM

(75) Inventors: Robert E. Blake, Woodbury Heights, NJ (US); Donald T. Hudrick, Sicklerville, NJ (US); David M Wilz, Sr., Sewell, NJ (US); Stephen Colavito, Boothwyn, PA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 575 days.

This patent is subject to a terminal disclaimer.

(21) Appl. No.: 11/753,388

(22) Filed: May 24, 2007

(65) Prior Publication Data

US 2008/0290170 A1    Nov. 27, 2008

(51) Int. Cl.
- G06K 7/10 (2006.01)
- G06K 19/06 (2006.01)
- G06K 7/14 (2006.01)
- G08C 21/00 (2006.01)
- G02B 26/10 (2006.01)
- H02P 1/00 (2006.01)

(52) U.S. Cl. .................. 235/462.06; 235/462.25; 235/462.3; 235/454; 235/462.01; 235/435

(58) Field of Classification Search ............ 235/462.06, 235/462.25, 462.3, 462.01, 454, 435
See application file for complete search history.

(56) References Cited

U.S. PATENT DOCUMENTS

| | | | |
|---|---|---|---|
| 4,034,230 A | 7/1977 | Brill et al. | |
| 5,003,164 A | 3/1991 | Barkan | |
| 5,015,831 A | 5/1991 | Eastman et al. | |
| 5,019,764 A | 5/1991 | Chang | |
| 5,099,110 A * | 3/1992 | Shepard et al. | 235/472.01 |
| 5,115,120 A | 5/1992 | Eastman | |
| 5,126,545 A | 6/1992 | Barkan | |
| 5,168,149 A | 12/1992 | Dvorkis et al. | |
| 5,200,597 A | 4/1993 | Eastman et al. | |
| 5,206,492 A * | 4/1993 | Shepard et al. | 235/462.38 |
| 5,252,816 A | 10/1993 | Onimaru et al. | |
| 5,258,699 A * | 11/1993 | Grodevant | 318/685 |
| 5,262,627 A | 11/1993 | Shepard | |
| 5,268,564 A * | 12/1993 | Metlitsky et al. | 235/462.48 |
| 5,280,162 A * | 1/1994 | Marwin | 235/462.31 |
| 5,280,163 A * | 1/1994 | Barkan | 235/462.36 |
| 5,280,165 A | 1/1994 | Dvorkis et al. | |
| 5,281,801 A | 1/1994 | Shepard et al. | |
| 5,315,097 A * | 5/1994 | Collins et al. | 235/462.25 |
| 5,329,103 A | 7/1994 | Rando | |
| 5,367,151 A | 11/1994 | Dvorkis et al. | |

(Continued)

Primary Examiner—Daniel Walsh
(74) Attorney, Agent, or Firm—Thomas J. Perkowski, Esq., P.C.

(57) ABSTRACT

The disclosure generally relates to a method and apparatus for determining if an optical scanner is moving. In one embodiment the method for sensing movement of an optical scanner comprises the steps of providing an oscillating system comprising a flexible member, a magnet coupled to the flexible member, a coil disposed within a magnetically effective distance from the magnet, and sense circuitry coupled to the coil; generating a first electrical signal from the oscillations of the flexible member; amplifying the generated electrical signal; analyzing the first electrical signal to determine if the generated signal is indicative of movement of the optical scanner.

11 Claims, 5 Drawing Sheets

U.S. PATENT DOCUMENTS

| | | | |
|---|---|---|---|
| 5,410,139 A * | 4/1995 | Barkan | 235/462.27 |
| 5,412,198 A | 5/1995 | Dvorkis et al. | |
| 5,420,411 A | 5/1995 | Salatto, Jr. et al. | |
| 5,422,469 A * | 6/1995 | Bard et al. | 235/462.33 |
| 5,422,471 A | 6/1995 | Plesko | |
| 5,422,472 A | 6/1995 | Tavislan et al. | |
| 5,464,976 A | 11/1995 | Scofield | |
| 5,475,206 A | 12/1995 | Reddersen et al. | |
| 5,479,000 A | 12/1995 | Dvorkis et al. | |
| 5,484,995 A | 1/1996 | Scofield et al. | |
| 5,486,944 A | 1/1996 | Bard et al. | |
| 5,506,394 A | 4/1996 | Plesko et al. | |
| 5,508,503 A | 4/1996 | Scofield et al. | |
| 5,512,744 A | 4/1996 | Scofield et al. | |
| 5,532,468 A | 7/1996 | Scofield | |
| 5,532,480 A | 7/1996 | Scofield | |
| 5,536,930 A * | 7/1996 | Barkan et al. | 235/472.01 |
| 5,539,192 A | 7/1996 | Scofield et al. | |
| 5,543,609 A | 8/1996 | Giordano et al. | |
| 5,543,610 A * | 8/1996 | Bard et al. | 235/462.44 |
| 5,550,366 A * | 8/1996 | Roustaei | 235/462.34 |
| 5,559,319 A * | 9/1996 | Peng | 235/462.36 |
| 5,581,067 A | 12/1996 | Grosfeld et al. | |
| 5,581,070 A | 12/1996 | Dvorkis et al. | |
| 5,589,679 A | 12/1996 | Dvorkis et al. | |
| 5,594,232 A | 1/1997 | Giordano | |
| 5,596,446 A | 1/1997 | Plesko | |
| 5,598,070 A | 1/1997 | Coleman | |
| 5,600,120 A | 2/1997 | Peng | |
| 5,614,706 A | 3/1997 | Bard et al. | |
| 5,621,371 A | 4/1997 | Dvorkis et al. | |
| 5,629,510 A | 5/1997 | Quinn et al. | |
| 5,637,856 A | 6/1997 | Bridgelall et al. | |
| 5,648,649 A | 7/1997 | Bridgelall et al. | |
| 5,656,804 A * | 8/1997 | Barkan et al. | 235/472.01 |
| 5,668,362 A | 9/1997 | Plesko | |
| 5,682,029 A | 10/1997 | Dvorkis et al. | |
| 5,698,835 A | 12/1997 | Dvorkis et al. | |
| 5,712,471 A | 1/1998 | Bremer | |
| 5,714,750 A | 2/1998 | Eastman et al. | |
| 5,723,851 A | 3/1998 | Salatto, Jr. et al. | |
| 5,750,976 A | 5/1998 | Eastman et al. | |
| 5,763,863 A | 6/1998 | Grosfeld et al. | |
| 5,764,398 A * | 6/1998 | Hayakawa | 359/203.1 |
| 5,786,585 A | 7/1998 | Eastman et al. | |
| 5,796,222 A | 8/1998 | Grodevant | |
| 5,804,809 A | 9/1998 | Eastman et al. | |
| 5,825,013 A | 10/1998 | Dvorkis et al. | |
| 5,866,894 A | 2/1999 | Bard et al. | |
| 5,874,720 A | 2/1999 | Dvorkis et al. | |
| 5,880,452 A | 3/1999 | Plesko | |
| 5,917,173 A | 6/1999 | Dvorkis et al. | |
| 5,923,025 A | 7/1999 | Dvorkis et al. | |
| 5,932,860 A | 8/1999 | Plesko | |
| 5,945,658 A | 8/1999 | Salatto, Jr. et al. | |
| 5,945,659 A | 8/1999 | Dvorkis et al. | |
| 5,973,318 A * | 10/1999 | Plesko | 250/227.22 |
| 5,984,188 A | 11/1999 | Dvorkis et al. | |
| 6,056,200 A | 5/2000 | Dvorkis et al. | |
| 6,059,188 A | 5/2000 | diFazio et al. | |
| 6,102,294 A | 8/2000 | Swartz et al. | |
| 6,114,712 A | 9/2000 | Dvorkis et al. | |
| 6,129,282 A | 10/2000 | Reddersen | |
| 6,142,379 A | 11/2000 | Bard et al. | |
| 6,149,061 A | 11/2000 | Massieu et al. | |
| 6,152,372 A | 11/2000 | Colley et al. | |
| 6,173,895 B1 * | 1/2001 | Plesko | 235/462.33 |
| 6,206,290 B1 * | 3/2001 | Giebel et al. | 235/462.36 |
| 6,227,450 B1 | 5/2001 | Blake | |
| 6,230,976 B1 | 5/2001 | Sautter et al. | |
| 6,303,927 B1 | 10/2001 | Ahten et al. | |
| 6,325,288 B1 | 12/2001 | Spitz | |
| 6,328,216 B1 | 12/2001 | Colley et al. | |
| 6,332,576 B1 | 12/2001 | Colley et al. | |
| 6,334,573 B1 | 1/2002 | Li et al. | |
| 6,347,744 B1 | 2/2002 | Metlitsky | |
| 6,360,949 B1 | 3/2002 | Shepard et al. | |
| 6,390,370 B1 | 5/2002 | Plesko | |
| 6,439,461 B2 | 8/2002 | Dvorkis et al. | |
| 6,491,222 B1 | 12/2002 | Dvorkis et al. | |
| 6,527,180 B1 | 3/2003 | Dvorkis | |
| 6,527,183 B2 | 3/2003 | Bard et al. | |
| 6,585,160 B2 | 7/2003 | Dvorkis et al. | |
| 6,592,039 B1 * | 7/2003 | Smith et al. | 235/462.49 |
| 6,612,192 B2 | 9/2003 | Hardy et al. | |
| 6,621,070 B2 | 9/2003 | Ahten et al. | |
| 6,687,034 B2 * | 2/2004 | Wine et al. | 359/212.2 |
| 6,712,270 B2 | 3/2004 | Leach | |
| 6,715,681 B2 | 4/2004 | Dvorkis | |
| 6,722,566 B1 | 4/2004 | Drzymak et al. | |
| 6,729,545 B2 | 5/2004 | Li et al. | |
| 6,769,616 B2 | 8/2004 | Fu et al. | |
| 6,884,993 B2 | 4/2005 | Ahten et al. | |
| 6,932,274 B2 | 8/2005 | Dvorkis | |
| 6,969,005 B2 * | 11/2005 | Otsubo | 235/462.33 |
| 6,981,645 B2 * | 1/2006 | Leach | 235/462.25 |
| 7,034,370 B2 | 4/2006 | Kuo | |
| 7,059,528 B2 | 6/2006 | Barkan et al. | |
| 7,071,931 B2 | 7/2006 | Tegreene et al. | |
| 7,182,262 B2 | 2/2007 | Wood et al. | |
| 7,204,424 B2 | 4/2007 | Yavid et al. | |
| 7,281,658 B2 | 10/2007 | Shepard et al. | |
| 7,296,750 B2 | 11/2007 | Wood et al. | |
| 7,306,154 B2 | 12/2007 | Takahashi | |
| 7,325,736 B2 | 2/2008 | Asai et al. | |
| 7,549,583 B2 * | 6/2009 | Blake et al. | 235/462.3 |
| 2001/0030237 A1 * | 10/2001 | Courtney et al. | 235/462.4 |
| 2004/0155860 A1 * | 8/2004 | Wenstrand et al. | 345/156 |
| 2005/0078169 A1 | 4/2005 | Tumer | |
| 2006/0231628 A1 * | 10/2006 | Wei | 235/462.3 |
| 2007/0119947 A1 * | 5/2007 | Blake et al. | 235/462.37 |
| 2008/0217410 A1 * | 9/2008 | Blake et al. | 235/462.3 |

* cited by examiner

SCANNER SWITCHED TO ACTIVE STATE BY SENSED MOVEMENT IN QUIESCENT SCANNING MECHANISM

BACKGROUND

1. Field of the Invention

The invention concerns triggering a change of state of a scanner mechanism from an idle or non-scanning state to an active scanning state, upon detecting movement of a resilient element provided in the scanning mechanism. In one embodiment, the movable element is the resonating flipper element that carries a reflector for scanning the beam, being driven in a feedback loop by an oscillator that is gated off during periods of inactivity. At least one mode for switching from the idle state to the active scanning state comprises setting a latch from an output of a feedback amplifier in the driving circuit. In addition to latching-on from detection of a minor shock or vibration so as to switch into the active state, the circuit is useful to verify that movement has commenced when switching into the active state via a different mode.

2. Prior Art

Bar code readers and similar beam scanning devices are used in various environments such as capturing product identification codes at retail point-of-sale stations, inventory and document tracking, order assembly and shipping and receiving, and in various other automatic data capture situations. An illuminating beam typically is scanned repeatedly over the code, using one or more reflectors that are moved so as to direct the beam from a fixed laser diode or the like along a scanning path. In a configuration exemplified in U.S. Pat. No. 6,227,450—Blake et al. (which is hereby incorporated in this disclosure), a flexible resilient polymer strip is fixed to a housing at one end, has a reflector on a side of the strip, and carries a magnet spaced from the fixed end. The magnet is subjected to electromagnetic force by an oscillator coupled to a coil that causes the strip to oscillate back and forth, thus tilting the reflector back and forth and directing the beam repetitively back and forth along a scan line.

Such a scanner may be mounted in or on a countertop or adjacent to a conveyor. To facilitate directing the scanning beam over the bar code, the scanner may comprise a movable scanning head that the user aims at the bar code. The scanning head may be tethered by a cable for managing power and communications lines, or may be self contained, battery powered and arranged for uploading data from time to time.

Battery powered hand-held scanners may be arranged to connect to a power and data communications connection (such as a USB port) or to dock in a stand at which the battery of the hand-held scanner can be charged. The device is not typically used in for scanning when in the stand, and power consumption and battery life are product design issues. To maximize battery life, hand-held scanners often have three distinct modes, namely "on," "off" and a standby or "sleep" mode. In the sleep mode, some circuit sections are at least partly disabled or unpowered, including the oscillator that electromechanically powers the scanner. A scanner may be configured automatically to enter the sleep mode if a predetermined time period elapses without scanning a readable bar code.

When the scanner is in sleep mode, arrangements are provided in response to some signal or switch closure or sensed event to reactivate or "wake-up" the scanner as needed to resume regular operation. Several of methods for waking scanners and similar devices are known in the art. One method of activating a quiescent scanner involves changing the state of a switch or trigger mechanism on a scanner head that a human user grasps, lifts from a dock or cradle or otherwise moves when commencing to aim the scanning head at a bar code to be read. The trigger mechanism may comprise a touch plate coupled to a circuit responsive to a change of capacitance that occurs when a human touches the device. A mechanically operated conductive trigger switch may be included that must be depressed or released or toggled. Other possibilities include tilt or weight responsive switches for a standing unit, magnetic or inductive couplings with a docking base, etc. Wake up switches and interlocks as described are not wholly satisfactory because they add expense and complication.

One method of triggering a change from quiescent to active operation is to detect that the scanning head has been redirected, potentially to be aimed, or that an item has been brought in front of the scanner, presumably to be scanned. For these objects, an infrared (IR) detector can be used to generate an activation triggering signal when the subjects in the field of view move relative to the detector. This technique is functionally apt because attempting a scan generally involves changing the position of the scanner relative to an item to be scanned or relative to fixed background items.

However, an IR source and detection circuits carry an associated expense in terms of parts, maintenance and power dissipation overhead. The power drain is particularly heavy because it is necessary to emit and detect IR signals throughout the period in which the scanner is quiescent in order to detect a movement of subjects in front of the scanner when it finally occurs. This technique is generally unsuitable if the scanner is to run on battery power.

Another known method of waking a scanner comprises intermittently activating the scanner according to a timer, at least to the extent necessary to determine from a test or partial scan that a bar code may be present (e.g., to detect contrasting brightness along a line in the field of view). In this method, the scanning assembly (e.g., the light source, oscillating mirror assembly and accompanying electrical circuitry) is activated momentarily at a predetermined schedule. The time interval between attempts needs to be relatively short because otherwise a user who wants to scan an item might be required to wait an undue time for the scanner to activate. If a potential data signal is returned, for example as a reflected light signal containing light and dark transitions characteristic of bar code information, then the scanner is activated, comes up to full operation and scans repetitively for a time. This test scanning method likewise consumes a good deal of battery power in determining when to switch into the active mode.

Scanning a bar code typically involves applying an illuminating beam and accumulating a response signal for a number of scanning repetitions. The reflected signal is accumulated and averaged, thereby reducing the adverse effects of some kinds of damage or dirt on a barcode label.

Power consumption and battery issues are perhaps less of an issue for a hand-held scanner that is wired to a stand or kept in a stand during scanning. The scanner may be inductively or electromagnetically coupled to a stand or base or docking station for charging. It still may be advisable to switch the device between modes of operation. For example, the scanner might be activated for scanning upon detection of its being manually removed from a charging stand. One way of generating an in-stand versus out-of-stand signal is to provide a magnet and a responsive Hall effect switch that interact when the scanner is on the charging stand. Components and circuitry are thus needed to generate an in-stand/-out-of-stand signal, which contribute to the cost of the scanner unit.

What is needed is a way to switch a scanner positively and conveniently between a power saving mode and a scanning mode without adding elements, expense or complication.

SUMMARY

It is an object of the invention to provide an activation signal for switching a scanner between a power saving quiescent mode and an active scanning mode, wherein the activation signal arises from sympathetic mechanical vibration of the resonant part of the scanner mechanism that is driven in the active mode for scanning. A modest vibration in the resilient or resonant part of the scanning mechanism occurs whenever the scanner head is picked up for scanning or jarred or bumped or otherwise vibrated.

According to another object, the resilient or resonant scanner mechanism is driven in the active mode in a feedback loop. This permits the sensing amplifier in the feedback loop to generate the activation signal. The scanner can comprise a resilient flipper having a strip of Kapton or another durable resilient polymer affixed to a mounting at one end, and bearing a reflector and a magnet. A relatively modest motion of the scanner head momentarily displaces the flipper, moving the magnet toward and away from a sensing coil and commencing the active scanning mode. The active drive continues to resonate the flipper for a predetermined time, and can be stopped after an interval during which no scannable code is detected.

Simply picking up the scanner head can produce the necessary magnet motion for activation of the scanner. No additional parts are needed. Activation is triggered using the amplifier already provided in the feedback arrangement. Scanning commences without the need for a user operated switch or a complicated or expensive IR detector.

In one embodiment the method for sensing movement of an optical scanner comprises the steps of establishing an oscillating system with a resilient or similarly movable member. A permanent magnet and/or one or more electromagnetic coils are provided, one being on the movable member and one being fixed, for applying an electromagnetic force, at least intermittently, to displace the movable member and cause the movable member to oscillate. A motion or proximity sensing circuit is coupled to generate a first electrical signal upon displacement of the movable member. This signal is coupled to trigger a circuit that is provided for one of indicating a moving stated of the movable member and gating an oscillator the drives the movable member by applying the electromagnetic force in timed relationship to the displacement of the movable member. The indicator function can provide an input to a further circuit such as a controller, for verifying powered oscillation. The gating function is used to establish and maintain oscillation for a predetermined time interval after the first electrical signal detects vibration or displacement of the movable member.

In a practical embodiment, the movable member is a resiliently mounted flipper carrying a beam scanning reflector and a permanent magnet. Two electromagnetic coils are provided. One of the coils provides an input to an amplifier due to changing magnetic flux from motion of the magnet. The other coil is driven from an output of the amplifier to drive displacement of the movable member from a rest position during oscillation. The output of the amplifier sets a latch when triggered by displacement of the movable member. This latch can switch-on with detection of motion and can be used as an input to a gate or timer to enable oscillation to continue for a predetermined time that is usually sufficient to complete a scanning operation. After such time, or for a predetermined time after any successful scanning operation, the latch can be reset and the oscillation gated off, allowing oscillation of the movable member to diminish to zero in the idle state of the apparatus. Provided the oscillation is not restarted from a control signal derived otherwise, the oscillating system remains idle until the movable member is moved or vibrated, e.g., by manually picking up a scanning head containing the movable member in preparation to scan a code. This triggers the device to resume powered oscillation.

The apparatus can be employed with a controller or other circuit to develop a logic status signal representing active motion. This signal is useful not only for triggering or enabling powered oscillation, but also as a diagnostic status signal. Thus while the oscillator is driving the coil or coils with the signals needed for powered oscillation, the lack of a true status signal representing active motion can represent a failure condition. This situation may occur, for example if the scanning mechanism has been damaged or has become stuck.

The disclosed apparatus and method are advantageously applied to a barcode scanner with a flipper assembly carrying a reflector and a magnet. The flipper assembly can have a resilient plastic strip of Kapton or the like, fixed at one end to a housing and carrying a reflective film and a permanent magnet subject to one or more coils mounted on the housing in position to displace the resilient strip and thus tilt the reflective film to scan a laser beam. A sensing circuit comprising an electromagnetic coil is configured to generated a current a signal due to movement of the magnet relative to the coil, which occurs upon displacement of the plastic strip relative to the housing. The current signal is amplified and used to drive a latch, flip-flop or similar logic element to provide a status indication that the device is in motion. This status indication can be used for initiating operation in an active state (i.e., to wake up the oscillator after an idle period) or for an operational status indicator (i.e., true when the plastic strip is moving) for other purposes as desired.

DETAILED DESCRIPTION

Figure 1:
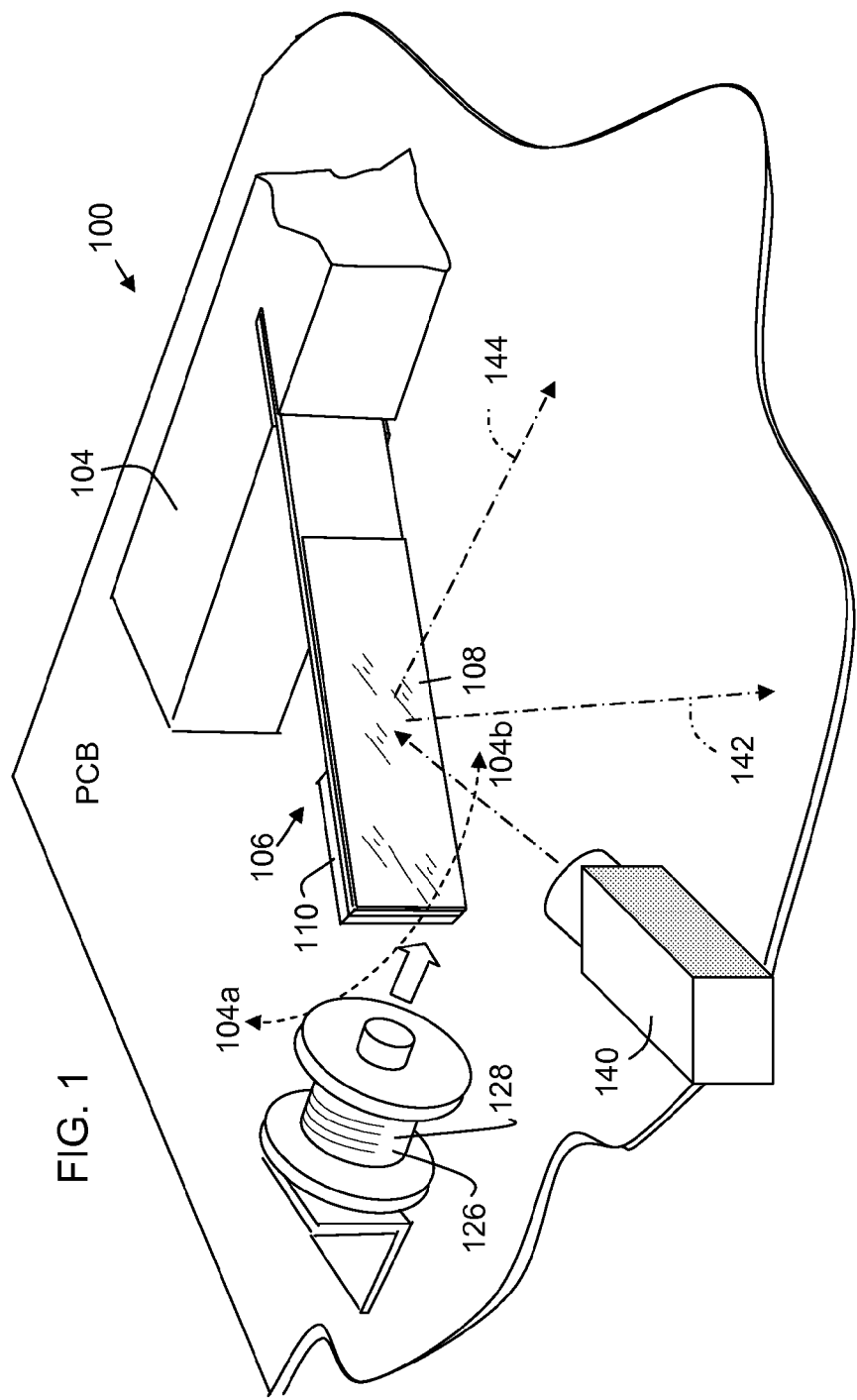
FIG. 1 is a schematic isometric view showing certain aspects of an exemplary embodiment of the inventive oscillating system as applied to a beam scanner.
Figure 2:
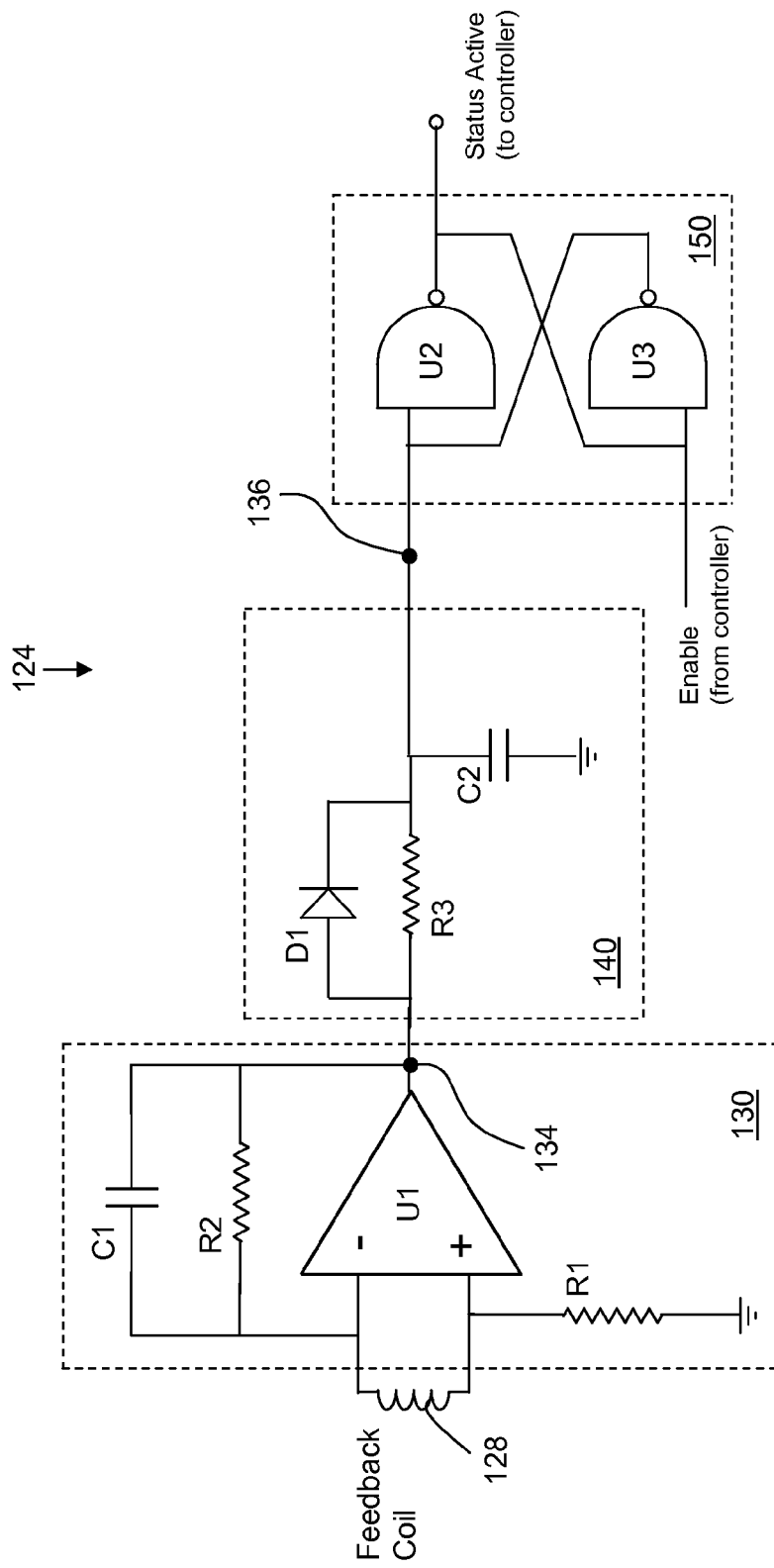
FIG. 2 is a schematic circuit diagram showing a motion sensing portion of a circuit according to the invention.

In the drawings, FIG. 1 illustrates a practical embodiment of a scanning device having a flipper carrying a reflector and a magnet for scanning a beam incident on the reflector from a laser beam source. FIG. 2 shows a practical motion sensing circuit employed to provide a signal that indicates whether the physically movable part of the scanning device, namely the flipper, is moving. The circuit of FIG. 2 can be used, for example, in a larger controlled device for commencing scanning operations when the apparatus is subjected to movement, discussed in the general depiction of FIG. 3.

Certain terms used in this description, such as "above," "below," "horizontal," "vertical," and similar terms that imply a direction, are used for convenience in this description and should not be considered to limit the subject matter to any particular orientation or configuration of relative positions in use. In general the device is operable in any orientation or configuration wherein the permanent and/or electromagnets are within operable range of one another and are oriented to urge or to detect displacement of the flipper from a rest position.

Terms concerning attachments, couplings, interactions by application of force and the like, such as "connected," "interconnected," "engaged," should be deemed to refer to the relative functional relationships of the elements that are described as attached or coupled or interactively secured or arranged. Therefore, such terms do not exclude interaction or coupling from spaced positions by application of motion, force or electromagnetic energy, either directly or indirectly or by physical forces that are effective over spaces or through intervening structures. Physical couplings and attachments also may be movable or rigid, and electrical couplings may involve the route of a signal as opposed to conductive or inductive couplings, unless expressly described otherwise.

For illustrative purposes, the resilient scanning element of invention is exemplified in this description by a Kapton polyimide resilient flipper strip, carrying a reflector that tilts during resilient displacement and oscillation to direct a reflected beam over a scanning path. This particular material and structure is apt for barcode scanners and other devices and readily can exploit the feedback drive and motion detection capabilities of the invention. Although the invention is not limited to such structures and materials, this disclosure hereby incorporates the full teachings of U.S. Pat. No. 6,227,450, regarding the structure and operation of resilient flipper scanner apparatus, as if fully set forth herein.

FIG. 1 illustrates an electromechanically driven oscillating mechanism 100 according to one embodiment of the present disclosure. The oscillating member 106 in this case is shown as a resilient strip attached at a fixed end to a mounting block 104. Spaced from the fixed end, the oscillating member or strip (sometimes termed a "flipper" in this disclosure) has a reflector 108 on one side, such as a metallic film laminated with the strip, and a magnet 110 spaced from the fixed end, e.g., being mounted on the end of the strip 106 opposite from the fixed end.

The strip is resilient, at least in an area adjacent to the mounting block 104. As a result, displacement of the free end of the strip from a rest position builds up an opposing force according to the spring constant of the strip 106. When force producing such displacement is released, the strip springs back. The strip is arranged such that displacing the strip via force applied to the magnet 110, maintains oscillation of the strip, back and forth relative to its rest position. As the free end of the strip periodically moves between extremes 104a, 104b, the reflector is tilted over a range of tilt angles. A laser beam is directed against the reflector 108 from laser 140 during active scanning, and scans a beam back and forth over a span between extremes 142, 144.

A magnetic force is applied to the magnet 110 by a drive coil 126 that is coupled to a periodic current source that is described with reference to FIGS. 2 and 3. At least at one point in the oscillating path of the flipper, a magnetic force is applied at a time and polarity that continues oscillation of the flipper 106 by urging the flipper along its oscillation path. All that is necessary to maintain oscillation is a sufficient force to exceed losses from frictional damping forces. However the drive amplitude preferably overdrives the flipper somewhat, to that when starting up, the flipper promptly reaches its steady state amplitude. If the flipper should be oscillating and drive force is gated off, the amplitude of the flipper oscillation damps over time to zero. By applying at least a pulse of magnetic field at the appropriate time in the period of oscillation of the flipper and with sufficient energy to overcome frictional damping, the oscillation can continue indefinitely, and by applying somewhat more than the minimum energy, the flipper can be started up.

In normal operation, scanning proceeds for a time sufficient for a given purpose such as scanning one or more barcodes on products in a customer order. After that, an indefinite time may elapse until the next products are presented to be scanned. In order to conserve power and to extend the useful life of the apparatus, the scanning mechanism advantageously is switched off during extended periods between uses for scanning. There are various time scenarios that might be used in deciding as a matter of programming when to discontinue oscillation. One technique is to stop scanning when not readable code is found for a predetermined period of time. The scanner drive circuits are switched off. The oscillation could be stopped for a time and resumed periodically to test whether a scannable code is in range. In any event, some event is used to trigger the resumption of scanning when the drive is gated of.

Although operation of a switch may be one event that triggers the commencement of oscillation, according to one aspect, the momentary acceleration or jarring of the apparatus produces some displacement of the flipper 106 when the device is bumped or picked up. The resulting signal is amplified and used by a portion 124 of the drive circuits as a switching signal that latches the scanning drive back into active scanning operation.

According to an aspect of the present disclosure as shown in FIG. 2, motion of the resiliently mounted flipper is detected using the feedback coil 128 that normally provides a sense signal to an amplifier U1. The amplifier provides an output signal coupled to a latch 150 for switching into a 'motion detected' state, provided that operation of the latch 150 is enabled at the time.

Preferably only a modest shock or vibration, as characteristic of manually grasping a handheld scanner or the like, produces enough impetus to produce modest displacement of the flipper 106. Displacement and return of the flipper to its rest position moves the magnet 110, causing a changing magnetic flux that induces a time varying current in sense coil 128. Coil 128 is coupled to an amplifier U1 as shown in FIG. 2, which can be a high gain differential amplifier or operational amplifier. The gain and pulse timing aspects of the amplifier are determined by the ratio of resistances of parallel resistor R1 and feedback resistor R2, and by capacitance C1. When the output of amplifier U1 goes high at junction 134, capacitor C2 charges through diode D1. Then the output at junction 134 goes low, capacitor C2 discharges somewhat more slowly through series resistor R3. Thus elements R3-C2 form an integrator with a short charging time constant and a long discharging time constant. If the latch formed by gates U2 and U3 is not already set (the latch can be reset by an enable output from a controller as discussed below, the latch becomes set when the require level appears at the input 136 to the latch.

Figure 3:
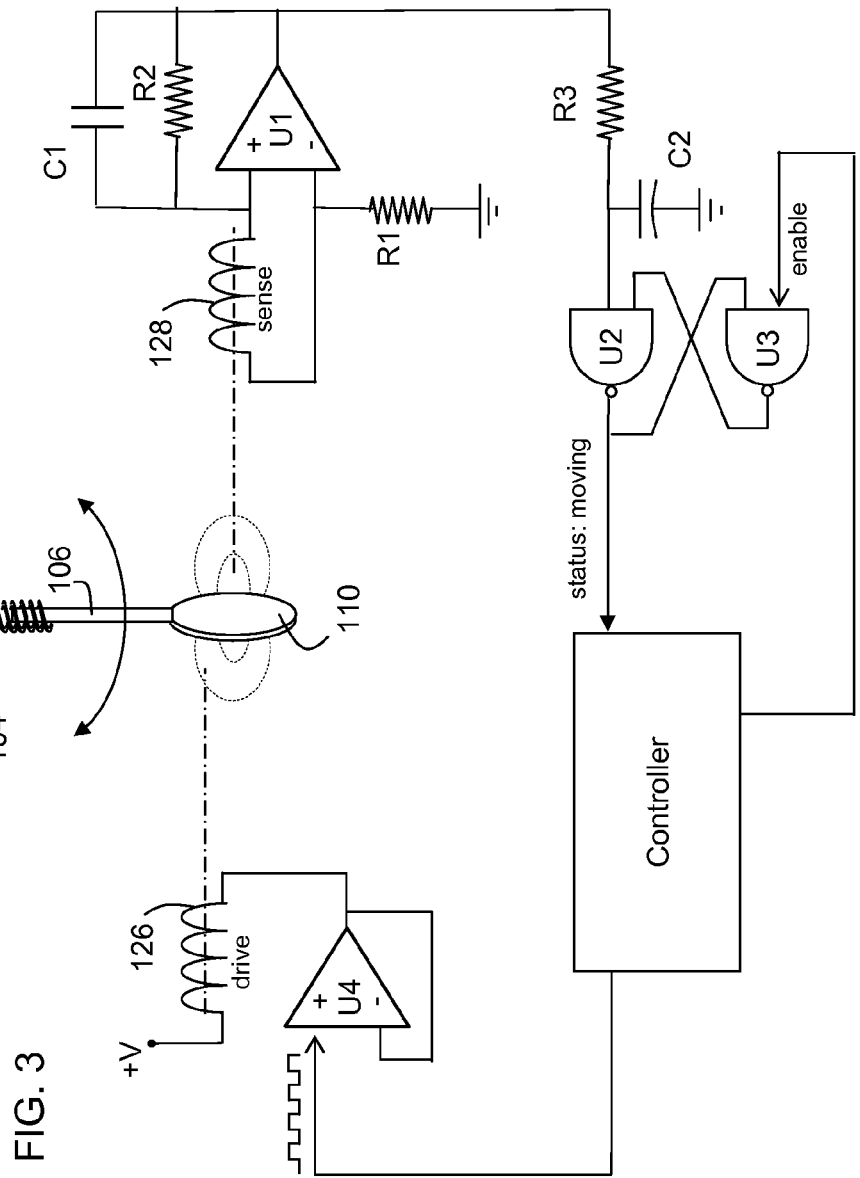
FIG. 3 is a block diagram illustrating the application of the invention to a scanning oscillator arrangement governed by a controller.

FIG. 3 shows how the flipper 106 functions as an element in a feedback arrangement. The flipper 106 resiliently carries magnet 110 on structure 104, so as to oscillate with respect to a drive coil 126 and sense coil 128. As shown in FIG. 1, the drive and sense coils 126, 128 can be provided on a common spool.

Assuming that a scan operation is intended while the scanning mechanism is in sleep mode (quiescent and stationary) manually grasping and picking up the scanning head results in acceleration of the scanning head, and in particular acceleration of the mounting structure 104 on which the flipper 106 is mounted at one end (see FIG. 1). Preferably, a typical manual motion of picking up the scanning head moves mounting structure 104 in a direction that has a vector component normal to the plane of the flipper 106. The flipper comprises a resilient flat strip. Movement of the free end of flipper 106 lags movement of the mounting structure 104 due to the inertia of magnet 110. Thus the acceleration produces a force that disturbs or tweaks the free end and magnet 110 thereon, displacing the flipper 106 from its rest position relative to mounting structure 104. The resilience of the flipper strip 6 applies a force to return the displaced free end, and magnet 110, to their rest position. The returning free end passes through the rest position, whereupon the return force reverses direction. The flipper strip oscillates in a damped oscillation back to its rest position.

It may be possible to move the scanning head so gently or slowly as to not perturb the flipper 106, but a typical manual movement produces a modest displacement. Relative movement of magnet 110 toward or away from sense coil 128, provides a changing level of magnetic flux at the sense coil 128, inducing a current coupled at the input to amplifier U1.

The integrator of resistor R3/C2 provides some time delay and filtering, but provided the magnet 110 induces sufficient current in sense coil 128, amplifier U1 is driven into saturation and the latch defined by gates U2-U3 is switched into the active or flipper-in-motion mode. The output of the U2-U3 latch is coupled as an input to a controller, shown generally, that produces a drive signal to the drive coil 126 via follower amplifier U4. The delay 8 in timing the drive pulse to drive coil 126 versus the motion sensed by coil 128 is preferably chosen to apply the drive pulse at a phase position that urges flipper 106 to advance at approximately its expected resonant frequency. In this way, driving of the flipper in a feedback oscillation mode commences. The electromechanical oscillation of flipper 126 continues and the amplitudes of voltage, current and displacement of the flipper stabilize. Preferably, the operation settles into a state where the approaching magnet 110 during each oscillation period provides a pulse to the controller and the controller in turn applies a further drive pulse, thereby maintaining oscillation.

It is possible in an arrangement as described to apply a sinusoidal current signal, out of phase with the coil displacement, so as to the drive coil 126 over its full period. Alternatively, a momentary force such as a pulse can be applied when the flipper is in an apt phase position to be urged forward in its oscillating path. To continue oscillation, the application of the magnetic field needs to have the required polarity and timing needed to continue rather than to oppose the desired movement of the flipper. Sense coil 128 develops a signal representing the position of the flipper at one or more points in its periodic cycle. Drive coil 126 can be driven with one timed pulse or multiple pulses or phase-space pulses of opposite polarity, etc.

Figure 4:
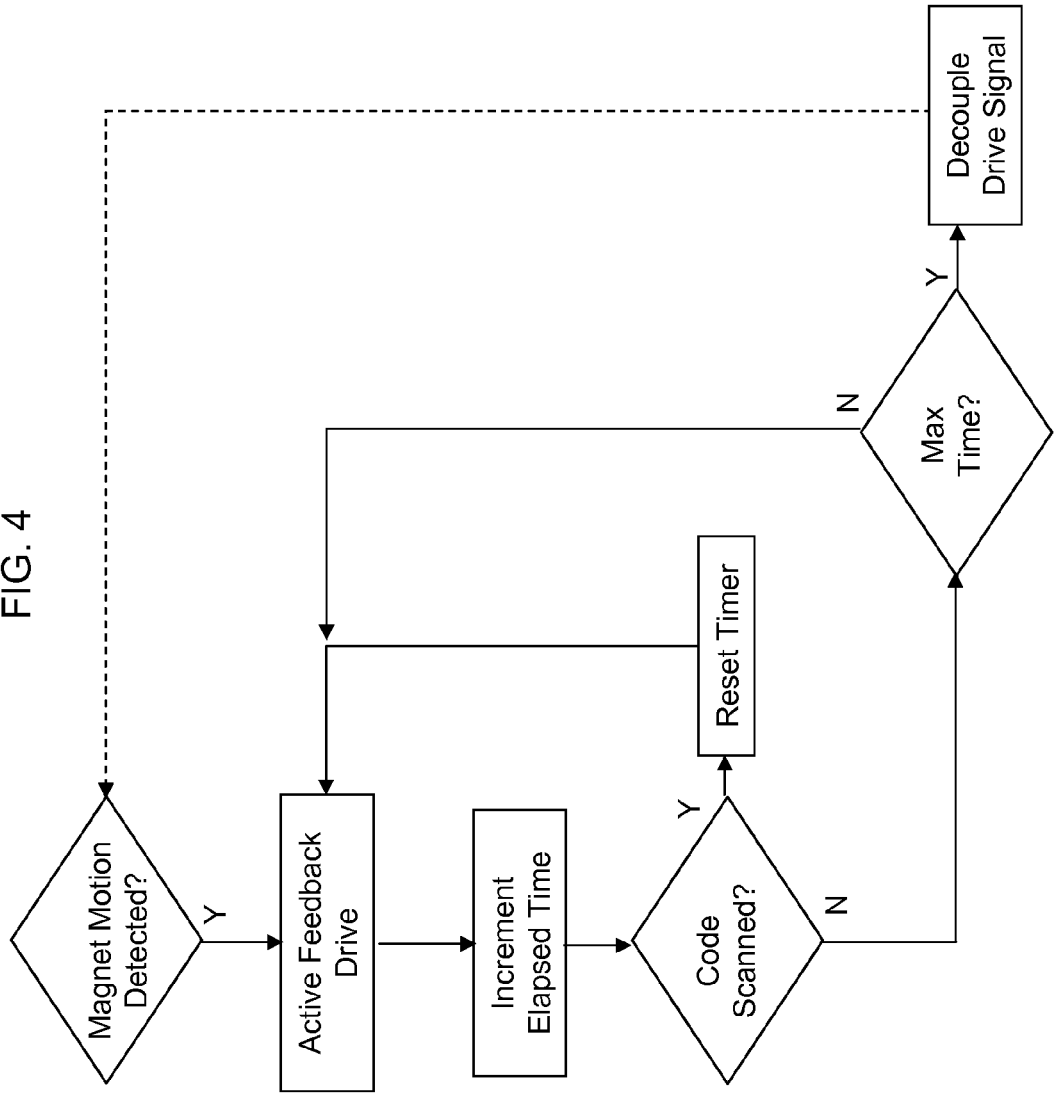
FIG. 4 is a flow chart illustrating certain time-out operational aspects for switching between active and sleep modes.

The controller as shown comprises or is associated by data communications with a processor that reads the bar code data in the signal contained in light reflected from the incident beam along the scanning path. The controller preferably continues to scan after initiating oscillation, but discontinues oscillation by disabling the input to gate U3 of the U2-U3 latch shown in FIG. 3 if no scannable code is encountered for a predetermined time. The time is apt for the particular operation, being at least somewhat longer than the typical delay between routine scanning operations. This arrangement is represented by the flow chart of FIG. 4.

When a motion signal is detected when in the quiescent or sleep state, active feedback drive is started. A program loop can increment timer until a code is scanned, whereupon the timer is reset. If the timer reaches the predetermined maximum time between scanning operations and no code has been scanned, the "Max Time" timer times out and the controller decouples the drive signal by resetting latch U2-U3. This passes the scanner back into the quiescent state, shown by the dashed line in FIG. 4.

In a preferred embodiment and as illustrated in FIG. 1A, flexible member 106 is formed by sandwiching a piece of KAPTON® film between two pieces of thin copper. The copper is removed by chemical etching at a gap portion where the flexible Kapton of member 106 functions as a resilient spring member that returns the flipper to a rest position absent driving forces. The flexible strip of member 106 can be, for example, approximately 0.5 to 2.5 mm thick, and more preferably 1 mm to 2 mm depending upon the desired resonant frequency of flipper assembly 102. The addition of the copper strips 106e adds rigidity to the KAPTON® strip and helps to form a flat reflecting surface at surface 108.

The light source 150 may likewise be switched on an off upon sensing motion of the flipper. Light source 150 may comprise a coherent light emitter, such as laser diode or micro-laser.

Magnet 110 may comprise any permanently magnetic material (e.g., ferrite, neodymium, samarium-cobalt, etc.). In one embodiment, magnet 110 comprises an integral neodymium magnet. One or more magnets 110 may be attached to flexible member 106.

The oscillating drive system (FIG. 3) may be in a reduced power state when the scanner is quiescent, but at least amplifier U1 remains powered and ready to amplify a signal caused by displacement of magnet 110 relative to sense coil 128.

If the scanner head is jostled or moved with a sufficient force, flipper assembly 102 is displaced and oscillates mechanically at a resonant frequency. As magnet 110 moves nearer and farther from sense coil 128, a current and voltage in feedback coil 128 provide a sense signal indicating movement of the flipper. That signal is amplified at U1. A resistor/capacitor integrator R3/C2 function as a low pass filter. The amplified and filtered signal operates latch U2-U3 if enabled.

At the output of the U2-U3 latch, the state of the signal can be analyzed using software in the controller, or in a simple embodiment is simply used to trigger switching into active scanning. The software may analyze the signal in a variety of ways to determine if the scanner should be turned on. For example, the software may be evaluated for length of oscillation, and if the sensed signal lasts for more than a certain period of time, the scanner exits the sleep mode and resumes scanning. Another way the software can determine if the scanner should wake up from sleep mode is by analyzing the frequency of the sensed signal. If the sensed signal has a frequency substantially similar to the expected resonant frequency of the flipper assembly 102, then the software can activate the drive circuitry and the scanner would begin scanning. These methods should not be construed as limiting as one skilled in the art will realize other ways of waking-up a scanner may be used.

Figure 5:
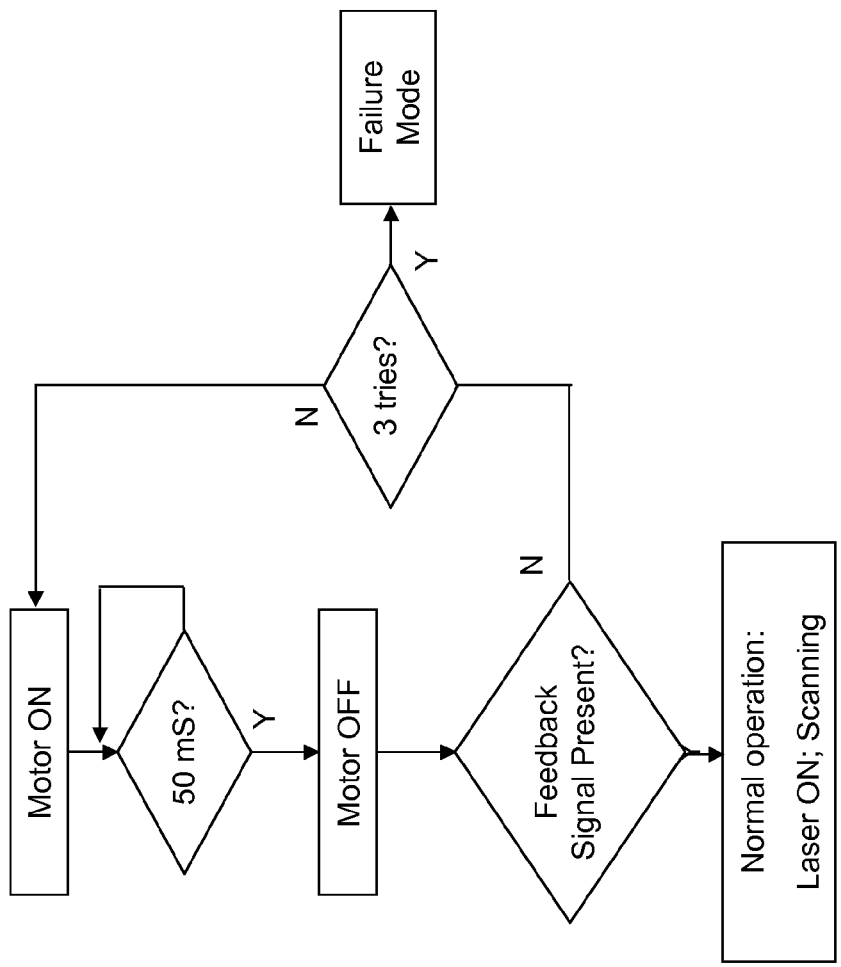
FIG. 5 is a flow chart illustrating operation in a self test mode.

According to another embodiment, shown in FIG. 5, the motion sensing arrangements described for switching from quiescent to active mode also can be used to provide a self test diagnostic function. In particular, when the oscillating scanning motor has remained in an ON state (i.e., oscillating so as to drive the flipper) for at least a minimum period of time (e.g., 50 mS), the drive can be momentarily switched off. If the flipper is moving resiliently, the magnet 110 will continue in damped oscillation to provide a sensed signal via sense amplifier U1, for a time after the drive signal from drive amplifier U4 has been discontinued. In FIG. 5, this is tried repeatedly for plural tries (e.g., three). If the flipper motion cannot be detected, then the flipper must be mechanically stuck or one or more of the circuit elements has failed. The system is then switched into a failure mode.

Using sensed oscillation to wake-up a scanner reduces power consumption, wear on moving parts and operational complexity on the part of the human operator. There are no switches to operate to trigger scanning because the controller is configured by programming and the like to anticipate a scanning operation from even a modest motion of the scanner head sufficient to bump the resilient flipper strip.

The invention has been described in terms of exemplary embodiments, but is not limited thereto. Rather, the appended claims should be construed to include other variants and embodiments of the invention, which may be made by those skilled in the art without departing from the scope and range of equivalents of the invention.

What is claimed is:

1. A method for controlling an optical scanner having a housing, a movable oscillating element and an electrically operated drive mounted within said housing and wherein said movable oscillating element is mounted resiliently relative to said housing and said housing is subject to manual movement, and wherein said electronically operated drive includes a sleep state, an active state, a sense coil to sense active movement of said movable oscillating element, and a drive coil to periodically move said movable oscillating element over a path, said method comprising the steps of:
   (a) said sense coil sensing the active movement of said movable oscillating element within said housing in response to movement of said housing, and automatically generating a sense signal;
   (b) in response to the generation of said sense signal, said electronically operated drive automatically switching from said sleep state to said active state, and generating a drive signal causing said drive coil to generate electromagnetic forces causing said movable oscillating element to periodically move over said path; and
   (c) said sense coil detecting when the movement of said movable oscillating element over said path dissipates and, in response thereto, said electronically operated drive automatically returning to said sleep state.

2. The method of claim 1, wherein said oscillating element comprises a weight on a resilient member affixed at one end to said housing, and further comprising perturbing said resilient member by physical contact coupled to said housing.

3. The method of claim 2, further comprising producing physical contact for perturbing said resilient member by manually moving said housing.

4. The method of claim 3, comprising manually picking up said housing to perturb said resilient member.

5. The method of claim 2, wherein said movable oscillating element comprises a magnet on said resilient member, spaced from the end fixed to said housing, wherein the resilient member carries a reflector, and wherein said method further comprises directing a beam against said reflector for scanning said beam during said active state.

6. The method of claim 5, further comprising enabling and disabling the beam in conjunction with switching between said active state and said sleep state.

7. An optical scanning apparatus, comprising:
   a housing;
   a flipper assembly including a flexible member with a fixed end affixed to said housing, said flexible member carrying a reflector spaced from said fixed end and a weight spaced from said fixed end, and said flipper assembly being configured to oscillate resiliently relative to said fixed end when perturbed, for varying an angle of the reflector during periodic scanning;
   an electronically operated drive circuit including
      (i) a sense coil for sensing active movement of said flexible element within said housing in response to movement of said housing, and generating a sense signal in response to sensed motion of said flipper element, and
      (ii) a drive coil for generating electromagnetic forces causing said flipper element to oscillate over a path in response to the generation of a drive signal provided to said drive coil;
   a control circuit for enabling said electronically operated drive circuit during an active state, and disabling said electronically operated drive circuit during a sleep state,
   wherein during said active state, said electronically operated drive circuit is enabled and driving said drive coil and causing said flipper element to oscillate over said path, and
   wherein during said sleep state, said electronically operated drive circuit is disabled and thereby permitting said flipper element to cease oscillation over a predetermined period of time; and
   wherein said control circuit switches from said sleep state to said active state when said sense coil senses active movement of said flipper element within said housing and generates said sense signal; and
   wherein said control circuit switches from said active state to said sleep state when said sense coil senses that the oscillation of said flipper element over said path has dissipated.

8. The optical scanning apparatus of claim 7, wherein said housing is manually movable, and manual movement of said housing perturbs said flexible member of said flipper assembly and switches said optical scanning apparatus into said active state.

9. The optical scanning apparatus of claim 7, wherein said housing comprising a hand held scanning head.

10. The optical scanning apparatus of claim 7, wherein said control circuit comprises a processor operable for processing said sense signal to detect at least one of (i) quiescence in said sleep state, and at least one of amplitude and frequency of said sense signal when said flexible member is in motion.

11. The optical scanning apparatus of claim 7, wherein said flexible member comprises a resilient polyimide film.

* * * * *